United States Patent
Eisenlohr

(10) Patent No.: US 10,769,740 B2
(45) Date of Patent: Sep. 8, 2020

(54) COOPERATIVE ENVIRONMENTAL AND LIFE BENEFIT EXCHANGE SYSTEM

(71) Applicant: Brett F. Eisenlohr, Avon, CT (US)

(72) Inventor: Brett F. Eisenlohr, Avon, CT (US)

(*) Notice: Subject to any disclaimer, the term of this patent is extended or adjusted under 35 U.S.C. 154(b) by 471 days.

(21) Appl. No.: 15/725,923

(22) Filed: Oct. 5, 2017

(65) Prior Publication Data

US 2018/0040089 A1 Feb. 8, 2018

Related U.S. Application Data

(63) Continuation of application No. 12/351,446, filed on Jan. 9, 2009, now abandoned.

(60) Provisional application No. 61/010,454, filed on Jan. 9, 2008.

(51) Int. Cl.
| | |
|---|---|
| G06Q 50/26 | (2012.01) |
| G06Q 30/02 | (2012.01) |
| G06Q 30/06 | (2012.01) |
| G06Q 50/06 | (2012.01) |
| G06Q 40/00 | (2012.01) |

(52) U.S. Cl.
CPC ............ *G06Q 50/26* (2013.01); *G06Q 30/02* (2013.01); *G06Q 30/0201* (2013.01); *G06Q 30/0216* (2013.01); *G06Q 30/06* (2013.01); *G06Q 40/12* (2013.12); *G06Q 50/06* (2013.01); *Y04S 50/10* (2013.01); *Y04S 50/14* (2013.01)

(58) Field of Classification Search
CPC ........................................ G06Q 30/0207–0277
See application file for complete search history.

(56) References Cited

U.S. PATENT DOCUMENTS

| | | |
|---|---|---|
| 4,103,493 A | 8/1978 | Schoenfelder |
| 6,718,761 B2 | 4/2004 | Merswolke et al. |
| 6,978,931 B2 | 12/2005 | Brobeck |

(Continued)

FOREIGN PATENT DOCUMENTS

RU 2005104564 A 8/2005

OTHER PUBLICATIONS

Chamberlin, John H., Pricing and Incentives, Proceedings of the IEEE, vol. 73, No. 10, Oct. 1985, pp. 1513-1518, reproduced via ip.com and IEEEXplore. (Year: 1985).*

(Continued)

*Primary Examiner* — Eric R Netzloff
*Assistant Examiner* — Michael R Stibley
(74) *Attorney, Agent, or Firm* — MKG, LLC

(57) ABSTRACT

A cooperative environmental and life benefit exchange system is presented. The system includes a grid for transmitting available electrical energy, a plurality of rate payers using energy generated from renewable energy sources, a plurality of utility companies providing the grid, a plurality of credits redeemable for acquiring one or more of a plurality of life benefits, and an administrator overseeing a redemption process. In one embodiment, credits are accumulated by the rate payers based on either a predetermined amount of electrical energy purchased from or sold back to the grid. In the redemption process the credits accumulated by the rate payers are redeemed at a redemption rate to provide a redemption value. The redemption value is remitted by the rate payers to satisfy benefit cost for acquiring the life benefits, or portions thereof.

9 Claims, 5 Drawing Sheets

(56) References Cited

U.S. PATENT DOCUMENTS

| | | | | |
|---|---|---|---|---|
| 2002/0049617 | A1* | 4/2002 | Lencki | G06Q 30/06 705/4 |
| 2002/0144503 | A1 | 10/2002 | Merswolke et al. | |
| 2003/0065610 | A1* | 4/2003 | Brown | G06Q 30/02 705/37 |
| 2005/0074665 | A1 | 4/2005 | Spaziante et al. | |
| 2005/0127680 | A1 | 6/2005 | Lof et al. | |
| 2006/0277131 | A1 | 12/2006 | Bacon et al. | |
| 2007/0219932 | A1 | 9/2007 | Carroll et al. | |
| 2008/0228628 | A1* | 9/2008 | Gotthelf | G06Q 10/06375 705/37 |
| 2008/0235063 | A1 | 9/2008 | Kasower | |
| 2009/0099915 | A1* | 4/2009 | Herzig | G06Q 30/0207 705/14.1 |
| 2009/0132360 | A1* | 5/2009 | Arfin | G06Q 30/02 705/14.14 |

OTHER PUBLICATIONS

Begovic, Miroslav, Sustainable Energy Development: Incentive Programs, School of Electrical and Computer Engineering, Georgia Institute of Technology, 2002 IEEE pp. 29-30, reproduced via ip.com and IEEEXplore. (Year: 2002).*

Richter, B. (2002). Reconciling global warming and increasing energy demand Journal of Business Administration. Retrieved from https://dialog.proquest.com (Year: 2002).*

Office Action issued in corresponding Canadian Office Action for Canadian Patent Application No. 2,749,285, dated Jul. 14, 2017, 5, pages.

International Search Report dated Sep. 21, 2009, 3 pages.

Schwartz, Andrew, "Renewable Energy Certificates and California Renewables Portfolio Standard Program", Apr. 20, 2006, California Public Utilities Commission, pp. 1-60.

Office Action issued in corresponding Indonesia Patent Application No. W00201102836, dated Jun. 25, 2014, pp. 1-2.

Extended European Search Report issued in corresponding European Application No. 09837750.0 dated Feb. 20, 2014, pp. 1-6.

Office Action issued in corresponding Canadian Patent Application No. 2,749,285, dated Sep. 6, 2016, pp. 1-4.

Office Action issued in corresponding Russian Patent Application No. 2011133018/08(048730), dated Jul. 31, 2013, pp. 1-6.

Decision of Refusal issued in corresponding Russian Patent Application No. 2011133018/08(048730), dated Aug. 13, 2014, pp. 1-3.

Office Action issued in corresponding Canadian Patent Application No. 2,749,285, dated Nov. 30, 2015, pp. 1-4.

Office Action issued in corresponding Indonesia Patent Application No. W00201102836, dated Feb. 3, 2017, pp. 1-2.

"Customer Credit Renewable Resources Account: Report to the Governor and the Legislature", California Energy Commission, Commission Report, pp. 1-42.

Office Action issued in corresponding European Patent Application No. 09837750.0-1958, dated Oct. 28, 2014, pp. 1-6.

Customer Credit Subaccount, California Energy Commission, Guidebook, Sixth Edition, vol. 4, Sep. 2001, pp. 1-63.

Office Action issued in corresponding Australian Patent Application No. 2009336142, dated Mar. 27, 2014, pp. 1-3.

Office Action issued in corresponding Canadian Patent Application No. 2,749,285, dated Aug. 3, 2018, pp. 1-8.

Office Action issued in corresponding Indian Patent Application No. 5861/DELNP/2011, dated Feb. 28, 2018, pp. 1-6.

Office Action issued in corresponding Russian Patent Application No. 2015104714/08(007371), dated Sep. 18, 2018, pp. 1-14.

* cited by examiner

COOPERATIVE ENVIRONMENTAL AND LIFE BENEFIT EXCHANGE SYSTEM

CROSS-REFERENCE TO RELATED APPLICATIONS

This patent application is a Continuation Application of U.S. Non-Provisional application Ser. No. 12/351,446, filed on Jan. 9, 2009, which claims priority benefit under 35 U.S.C. § 119(e) of U.S. Provisional Patent Application, Ser. No. 61/010,454, filed Jan. 9, 2008, the disclosures of each of which are incorporated by reference herein in their entireties and the benefits of each are fully claimed herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to a system and method for encouraging renewable energy generation and, more particularly, to a cooperative environmental and life benefit exchange system wherein consumers of electrical energy receive one or more life benefits based at least in part on the consumers' purchase or generation of electrical energy from renewable energy sources.

2. Related Art

As illustrated graphically in FIG. 1, for more than a century electric utility companies (UTL 1-UTL N) around the world, shown generally at 20, have been in the business of generating and distributing electric power (energy, E) 80 to consumers or rate payers, shown generally at 60. For example, a utility company 22 invests capital to develop and maintain generating facilities 24 (e.g., generated electrical energy by burning fossil fuels to turn turbines, harnessing solar, geothermal, wind, hydro and nuclear energy, and the like) and transmission facilities 26 for providing the electric power 80 to its rate payers 60. Individual transmission facilities, such as the transmission facility 26, include overhead and underground power transmission lines that are typically operatively coupled to provide a network of transmission capability commonly referred to as an electrical grid, or simply a grid, shown generally at 40. The utility companies 20, individually and collectively, are responsible for the daily operations and maintenance of the grid 40 and related infrastructure within the network as it spans across a region, a country and the globe. Responsibilities include a constant monitoring (e.g., 24 hours a day, 7 days a week, 365 days a year) of the grid 40 to ensure reliability and accountability. Some utilities have other responsibilities described below (e.g., regulatory mandates).

Generally speaking, the electrical energy 80 that is sold to and consumed by the rate payers 60 is measured via an electric meter 64 located at a site (e.g., a residential, commercial, educational, recreational or governmental facility) of each rate payer 60. There are a number of ways in which the utility companies then obtain information from the meters 64, referred to herein as meter information 66, including but not limited to, manual meter readings, smart grid digital systems, and automated meter reading (AMR). The utility companies 20, for example, the utility company 22, generates an itemized billing statement 28 from the meter information 66 and sends the rate payers 60, for example, rate payer 62, the itemized billing statement 28. In some embodiments, the billing statement 28 provides the rate payer 62 with the meter information 66 collected from the meter 64 indicating a total amount of energy that was used during a specific period of time, for example, a predetermined billing cycle, of about monthly, quarterly or the like. The billing statement 28 may include a number of associated fees and services related to generation, transmission or other information, as well as a method for the rate payer 60 to remit payment 68 for the provided energy 80. Typically, an amount of the payment 68 is based on the energy consumption of the rate payers 60 (e.g., usage). For example, the utility company may charge ten cents per one kilowatt-hour ($0.10/kWh) of electricity used. As can be appreciated, rates for electricity usage are based on many factors such as, for example, consumer type (e.g., residential, commercial, industrial and transportation) and as such vary from market to market. Typical kilowatt-hour usage rates range from about $0.055 to $0.324 dollar per kWh.

In some areas such as, for example, states within the United States of America, there is a deregulated energy market. Within such markets, rate payers 60 are allowed to choose among a plurality of utilities 20 generating and supplying energy 82 and 84 (utilities having their own generating facilities), while the delivery of the power, for example, the transmission and distribution over the grid 40 (transmission facilities 26) may reside with another utility. Therefore, the rate payers 60 can contract for the supply of energy E from one of several (UTL 1-UTL N) competing utility companies 20 to find a best price and contract terms for receiving consumable energy 80.

As noted above, the generating facilities 24 may include facilities producing energy in a variety of differing ways. For example, the generating facilities 24 may provide electrical energy E 82 by burning fossil fuels (e.g., coal, petroleum, or natural gas), or electrical energy (E') 84 by collecting and harnessing solar, geothermal, wind, hydro and nuclear energy. As is generally known, some methods of generating electrical power may generate harmful emissions such as carbon dioxide or other greenhouse gases. There has been an ever increasing concern over the release of such harmful emissions and their impact on the atmosphere that may be causing climate change, referred to as Global Warming. For example, global efforts to reduce harmful emissions has lead to an international treaty, referred to as the United Nations Framework Convention on Climate Change, and its principal update establishing mandatory limits on greenhouse gas emissions for individual nations and/or industries, as well as enforcement provisions, referred to as the Kyoto Protocol. One impact of the Kyoto Protocol has been the creation of a commodities market in which allowance for emissions, referred to as Carbon Credits, are purchased, sold and traded. One such market is an exchange system referred to as the Chicago Climate Exchange (CCX).

As can be appreciated, individual electric power consumers, e.g., the aforementioned rate payers 60, may share the concerns over Global Warming as well as other economic and/or political concerns that may have the rate payers 60 looking to domestic, environmentally friendly methods of generating electrical power such as renewable energy (RE)

generation. As illustrated schematically in FIG. 2, rate payers 100 typically have two options in seeking RE. Firstly, a rate payer 110 may purchase and install an on-site RE generation system 120 to satisfy or to offset its demand for conventional energy E and then take advantage of the eligible tax credits and/or rebates for such self-generating activities. When the on-site RE generation system 120 generates a surplus of energy E' above and beyond what is needed by the rate payer 110, then the rate payer 110 may sell the excess electrical energy E' 122 back to the grid 40, for example, a local utility company for a specified rate depending on certain rules or regulations. To date, the initial capital investment needed to construct the on-site RE systems such as system 120, may be out of the reach of some rate payers. Therefore, some rate payers must pursue another option.

When the rate payers 100 are purchasing energy in deregulated energy markets, e.g., such as a rate payer 130, the rate payer 130 may choose to purchase energy from a utility company 160 that generates electrical power E' by means of renewable energy system such as a solar system 162, versus a utility company 170 that generates electrical power E through less environmentally friendly ways such as, for example, by burning fossil fuels to drive a turbine generator 172. For example, in many regions within the United States utility companies having large scale RE projects that produce power, such as the utility company 160, and are competing with other utility companies, such as the utility company 170 not employing renewable energy. As such, the utility company 160 can offer consumers a choice of purchasing energy E' that is generated from clean renewable resources instead of a current "standard offer" which, in large part, is energy E generated by burning dirty fuels that pollute the environment. In these markets, therefore, rate payers 100 can choose to purchase clean RE from a supplier (e.g., utility company 160) as an option and know that the energy they are consuming is reducing the amount of pollution that would otherwise be entering the atmosphere. Currently, the rate payers 100 (e.g., rate payer 130) who consciously select this option are paying a premium for the electricity E' generated with RE versus the less expensive standard offer of electricity E generated in non-environmentally friendly ways. For these rate payers 130 the benefits in protecting the environment outweigh the additional cost. As more rate payers choose this path of purchasing clean energy, their purchasing power can encourage utility companies to invest in RE generation. For example, utility companies may choose to develop RE generation to acquire new consumers, to meet regulatory mandates, to reduce their greenhouse gas emissions as a corporate strategy, or for other reasons and strategies.

As is generally known, most, if not all, electric utility commissions are subject to certain regulatory policies or mandates to increase production of electricity from RE sources such as, for example, wind, solar, biomass, and geothermal energies. For example, one such regulatory mandate is referred to as a Renewable Portfolio Standard (RPS), which stipulates a minimum percentage of energy generated from RE systems must be included within each utilities total mix of generated power. Thus, the utility companies must either develop their own RE plants to generate the require capacity of E' from RE sources in order to be in compliance, or purchase the required amount of E' from another source to fulfill its RPS obligations. At least one objective of such mandates is to encourage utility companies to reduce the amount of pollution that they create. However, the electrical power E' generated by RE sources, whether within the scope of a regulatory mandate or otherwise, is distributed on the electrical grid 40 and thus, is not separated from traditional sources of electrical energy such as, electrical energy E generated by burning fossil fuels or coal, or harnessing nuclear power. Therefore, the consumer purchasing power through "standard offering" on the grid 40 may or may not be consuming energy generated from renewable resources. As such, rate payers 100 may not know whether their purchasing power is being leveraged to encourage renewable energy.

At least one development stemming from regulatory policies encouraging deployment of renewable energy technologies such as, for example, RPS, the Kyoto Protocol and others, is the creation of tradable environmental commodities. For example, a Renewable Energy Certificate (REC) represents a mechanism for acknowledging that one megawatt-hour (1 MWh) of electricity was generated from an eligible renewable energy resource. RECs, like Carbon Credits, may be created, sold and traded in an energy commodities market such as, for example, the CCX. As noted above, companies may purchase RECs in the market to offset non-compliant polluting activities and therefore remain below its mandated allowance of emissions.

As shown schematically in FIG. 3, rate payers 200, and people in general, must balance the cost of life's necessities and/or conveniences (e.g., quality of life benefits) with funds available to purchase such benefits. For example, people often have costs or expenses 202 in order to receive a benefit B 204 of housing 210 (e.g., paying a mortgage or rent), food 220, retirement 230, life insurance 240, health insurance 250, education 260, energy 270 (e.g., lights, power and transportation), as well as other quality of life benefits, for themselves and/or their dependents. Under certain circumstances, a portion 302 of such costs 202 may be paid by a third party payer 300 such as, for example, an employer, a governmental institution or other beneficial agency. Without contribution 302 from the third party payer 300, the person 200 is solely responsible for the total costs 202 of receiving the benefits 204 of such items 210-270. As can be appreciated, not all people can afford all of these costs 202 let alone be fortunate enough to choose a more costly item as doing so would result in a more positive impact on the environment. For example, some people would like to purchase only electric power E' 272 generated through use of clean, renewable energy generation such that the person's activities leave a smaller environmental footprint. However, such a decision may be more costly, and other needs would need to be defrayed. Accordingly, rather than choosing a more desirable environmentally friendly sources, the consumer purchases a less expensive alternative such as the electrical energy E 274 generated by burning less expensive dirty fuels.

Therefore, the inventor has recognized that there is a need for a cooperative structure that promotes and encourages use of renewable energy while providing a contribution, credits or incentives based on such usage and other factors that can be used to acquire needed or desired quality of life benefits such as the aforementioned benefits B 204 for housing 210, food 220, retirement 230, life insurance 240, health insurance 250, education 260 and energy 270 benefits.

SUMMARY OF THE INVENTION

The present invention resides in one aspect in a cooperative environmental and life benefit exchange system. The exchange system includes a grid network for transmitting available electrical energy, a plurality of rate payers using electrical energy generated from renewable energy sources, a plurality of utility companies cooperating to provide the grid network, a plurality of credits redeemable for acquiring one or more of a plurality of life benefits, and an administrator overseeing a redemption process. In one embodiment, the rate payers include a first subset of rate payers that purchase their electrical energy from the grid, and a second subset of rate payers having renewable energy generation systems for generating electrical energy and selling surplus electrical energy back to the grid. In one embodiment, the utility companies include a first subset of utility companies having renewable energy generation systems for generating and providing electrical energy to the grid, and a second subset of utility companies that purchase the surplus electrical energy generated by the second subset of rate payers.

In one embodiment, credits are accumulated by the rate payers based on either a predetermined amount of electrical energy purchased from the grid or from a predetermined amount of surplus electrical energy sold back to the grid. The life benefits are each acquired at a benefit cost, and provide a quality of life benefit to a rate payer or a beneficiary of the rate payer. In the redemption process the credits accumulated by one or more of the rate payers are redeemed at a redemption rate to provide a redemption value. The redemption value (e.g., a monetary value) is remitted by the one or more rate payers to satisfy the benefit cost for acquiring one or more of the life benefits, or portions thereof. In one embodiment, the administrator has an interface for registering and tracking the plurality of credits within the exchange system. The interface determines an amount of credits assigned to each of the rate payers based on the energy purchase and sale transactions. The interface is also used to supervise the redemption process.

In one embodiment, the life benefits include health insurance, life insurance, educational assistance, retirement savings, housing allowance, and food allowance. In one embodiment, a corporate entity such as an insurance company provides or sponsors one or more of the life benefits. In one embodiment, the system includes a plurality of accounts. The accounts are associated with one or more of the rate payers and receive the redemption values of redeemed credits of the associated rate payers at the conclusion of the redemption process. The redemption values are then remitted by the rate payers to pay benefit costs and acquire one or more of the life benefits. In one embodiment, a financial institution provides the plurality of accounts.

In one embodiment, the interface includes a cooperative interface executing on a computer processing system of the administrator to host a plurality of web pages. The web pages are accessible in real-time by one or more of the rate payers and the utility companies for viewing a total number of credits held by rate payers, for monitoring a status of the redemption values, and for evaluating available life benefits.

BRIEF DESCRIPTION OF THE DRAWINGS

The features and advantages of the present invention will be better understood when the Detailed Description of the Preferred Embodiments given below is considered in conjunction with the figures provided.

In these figures like structures are assigned like reference numerals, but may not be referenced in the description of all figures.

DETAILED DESCRIPTION OF THE PREFERRED EMBODIMENTS

Figure 1:
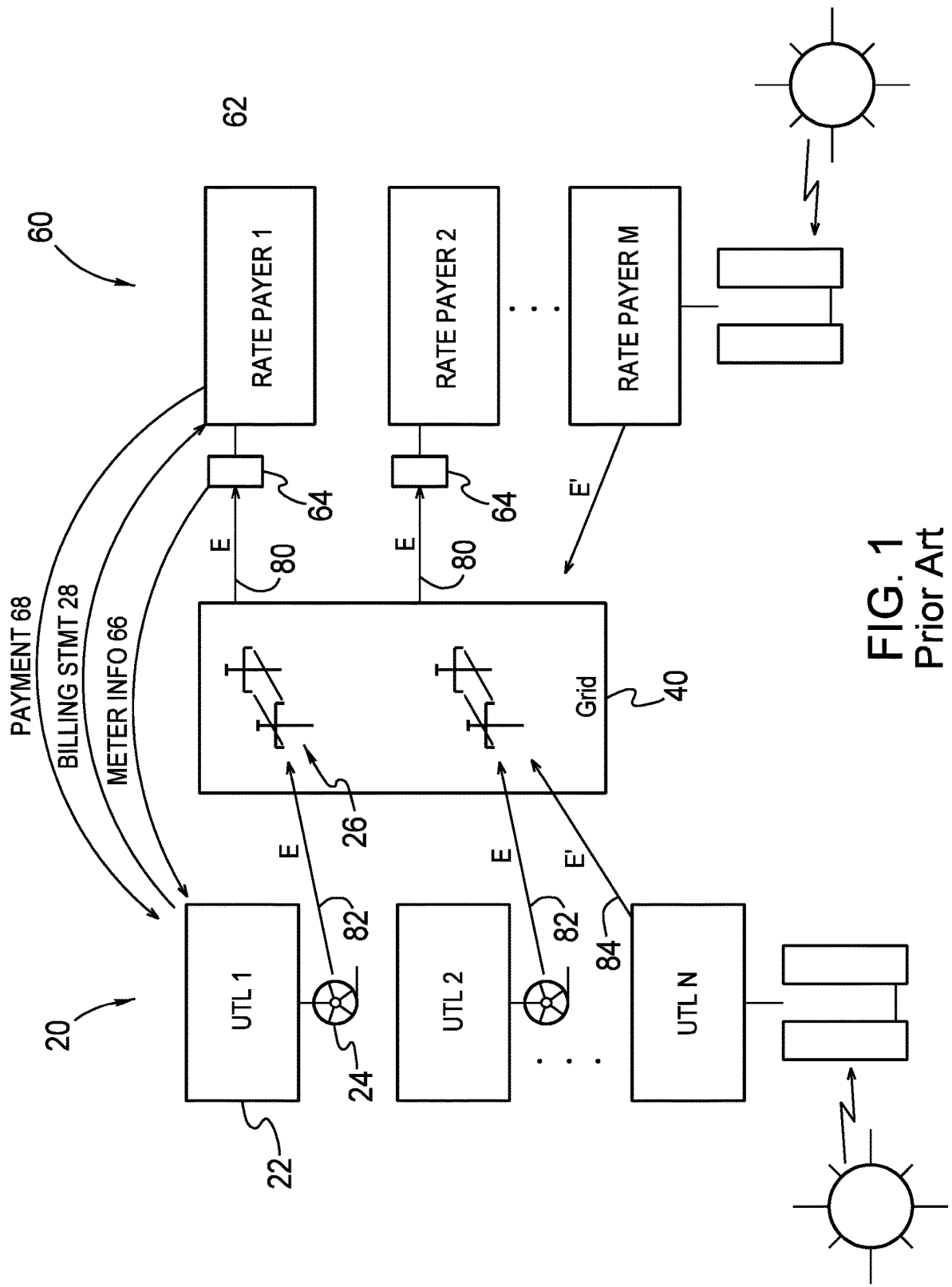
FIG. 1 is a schematic block diagram illustrating conventional electrical energy generation and distribution between providers and consumers of such electrical energy as is known in the art.
Figure 2:
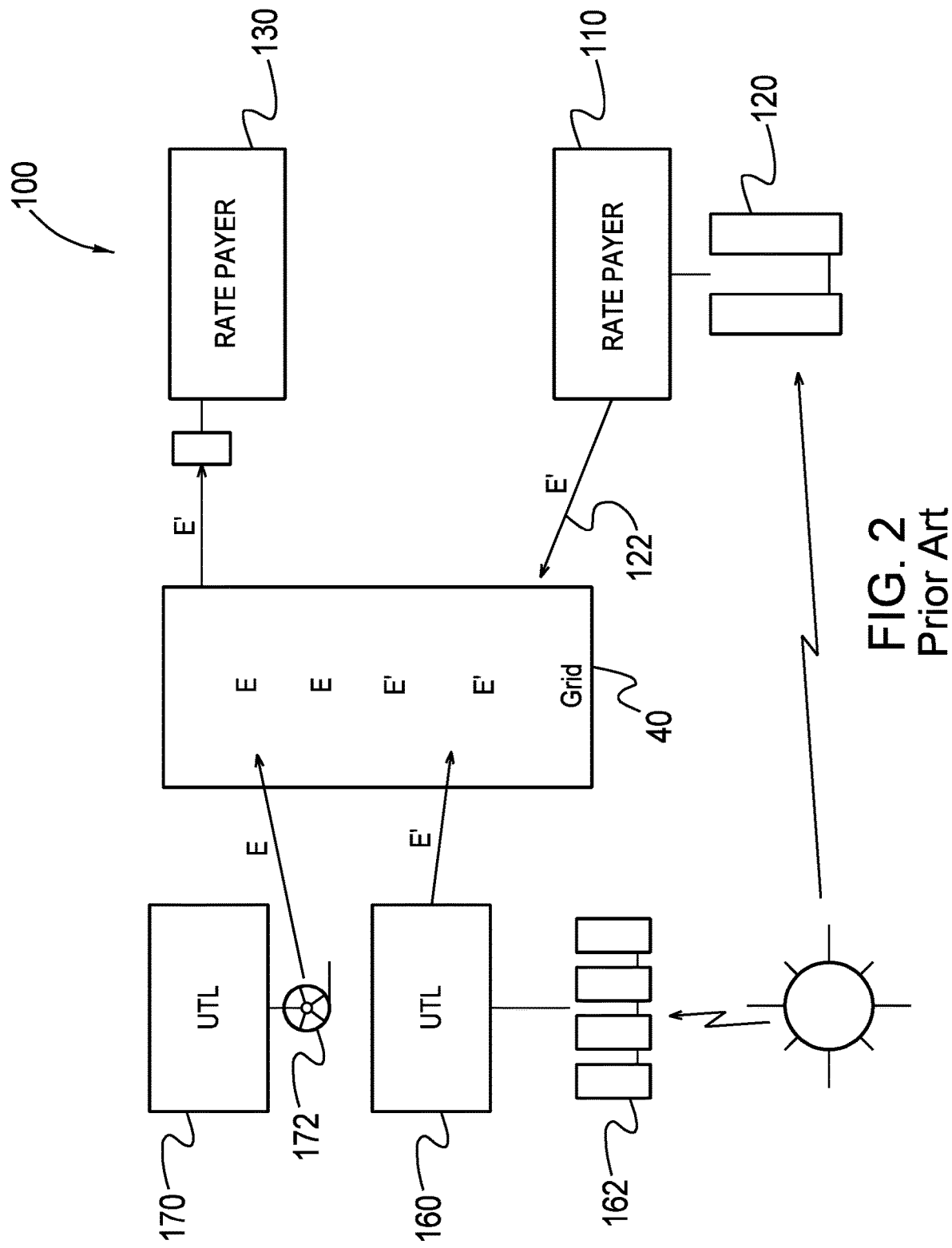
FIG. 2 is a schematic block diagram depicting renewable energy generation and distribution options for the consumers of FIG. 1.
Figure 3:
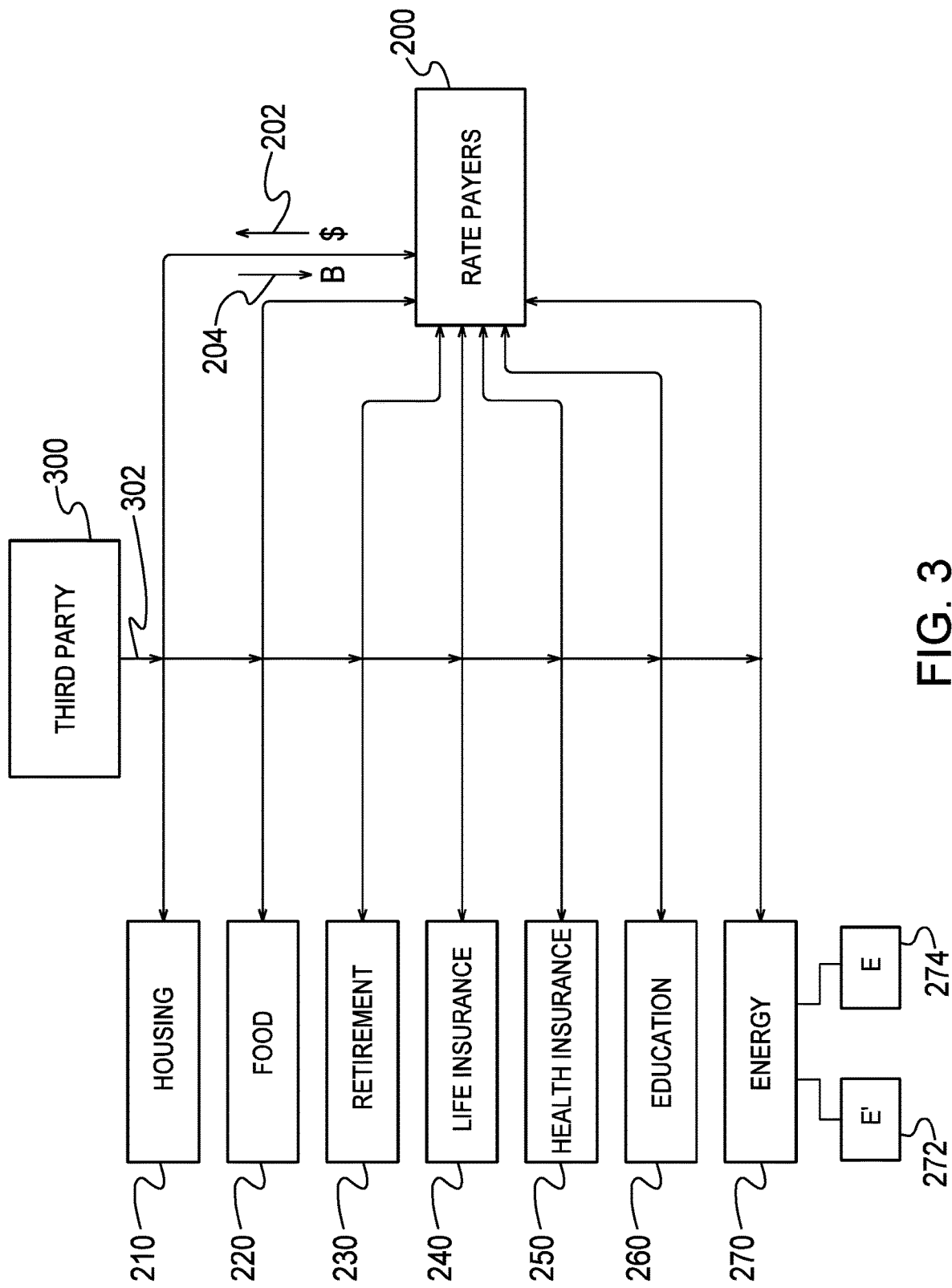
FIG. 3 is a schematic block diagram of some factors consumers consider when acquiring quality of life benefits with funds available to purchase such benefits.
Figure 4:
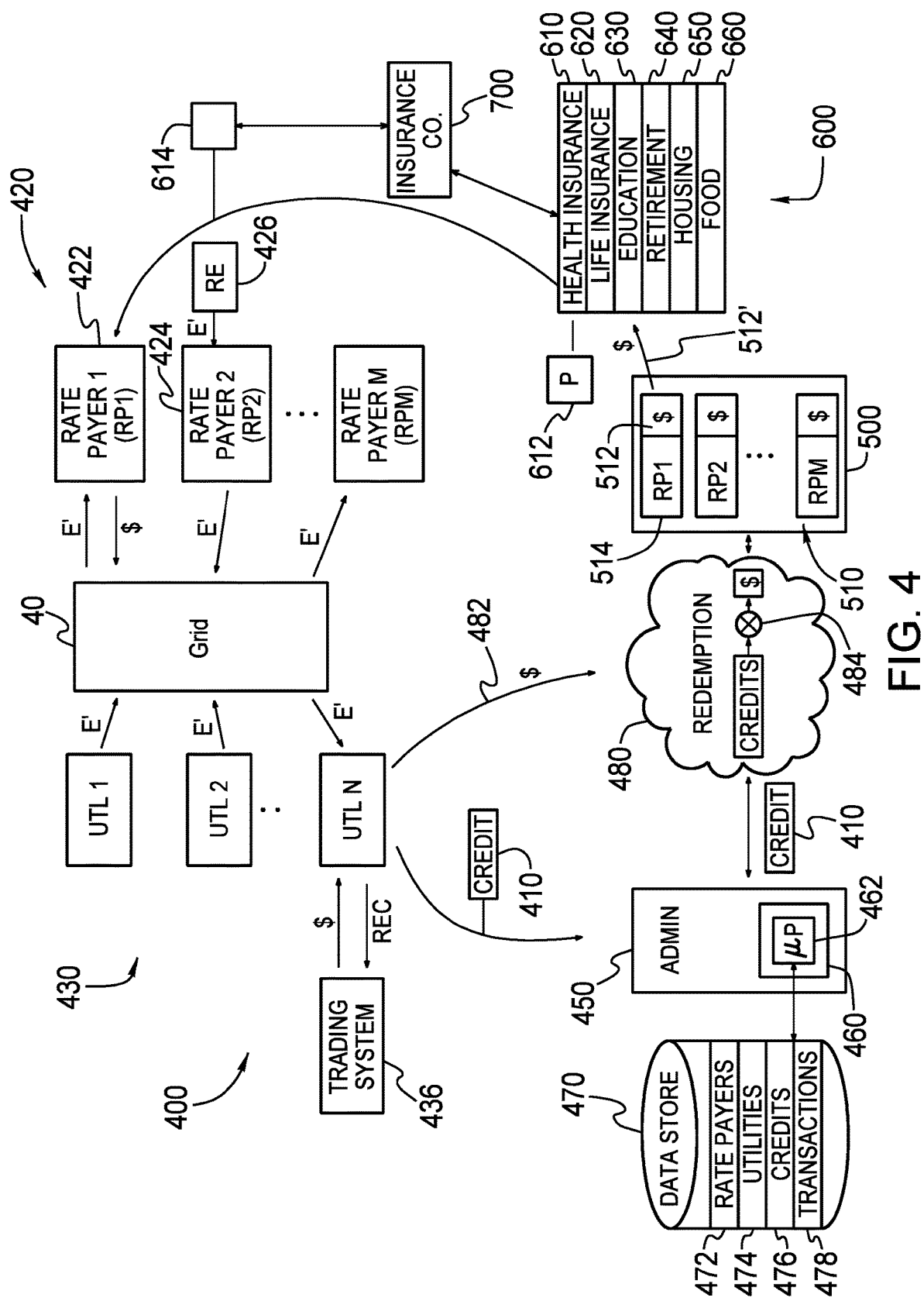
FIG. 4 is a schematic block diagram of a cooperative environmental and life benefit exchange system in accordance with one embodiment of the present invention.

FIG. 4 illustrates one embodiment of a cooperative environmental and life benefit exchange system 400, in accordance with the present invention, wherein consumers of electrical energy, shown generally as rate payers 420, receive one or more life benefits 600 (or portions thereof) based at least in part on the rate payers' purchase or generation of electrical energy from renewable power sources. As described herein, the cooperative environmental and life benefit exchange system 400 provides a mechanism by which credits 410 are accumulated by rate payers 422 that purchase electrical energy E' from utility companies 430 generating the electrical energy E' with renewable energy (RE) systems including, for example, solar, photovoltaic, wind, biomass, landfill gas, fuel cells (using renewable or non-renewable fuels), ocean thermal power, wave or tidal power, hydropower, selected municipal solid waste, and geothermal systems. In one embodiment, credits 410 are also accumulated by rate payers 424 that are generating the electrical power E' with their own RE systems 426. In one embodiment, a credit 410 corresponds to a predetermined amount of electrical power E' purchased from or sold back to the grid 40. For example, in one embodiment, one (1) credit is allocated for each one kilowatt-hour (1 kWh) of renewable energy E' purchased by the rate payer 422, and one (1) credit is allocated for each one kilowatt-hour (1 kWh) of renewable energy E' generated by the rate payer 424 and sold back to the grid 40. It should be appreciated that it is within the scope of the present invention to employ other credit to kilowatt-hour relationships. As described below, each of the credits 410 is redeemable by or on the behalf of rate payers 420 for a predetermined monetary value that is applied to costs of acquiring the life benefits 600 (e.g., benefit costs) such as, for example, health insurance 610, life insurance 620, educational assistance 630, retirement savings 640, housing allowance 650, food allowance 660 as well as other quality of life benefits, for themselves and/or their dependents, for example, a designated third party or beneficiary such as, e.g., a child, spouse, parent, employee, and the like. In one embodiment, an employer generates renewable energy E' at its place of business and sells surplus back to the grid 40. Rather than keeping credits 410 accumulated from such activity, the employer may disperse the credits 410 received between two or more of its employees, shareholders, or the like.

As shown in FIG. 4, an administrator 450 registers and tracks the credits 410 acquired by each of the rate payers 420, e.g., the rate payer 422 and the rate payer 424, throughout the system 400. In one embodiment, the administrator 450 employs a cooperative interface 460 such as, for example, a data processing system including a data processor 462 executing program instructions for determining the credits 410 based on energy E' purchase and sale transactions and for conducting redemption thereof. In one embodiment, the data processor 462 is operatively coupled to a data store 470. In one embodiment, the data store 470 stores information 472 for identifying rate payers 420, information 474 for identifying utility companies 430, credit information 476, transaction history information 478 and other information necessary or desirable for operating the system 400 such as, for example, variables representing a rate at which energy usage is converted to credits, information detailing energy E' purchase and sale transactions and variables corresponding to time periods and rates used within a redemption process described below. In one embodiment, the administrator 450 receives a value representing a number of credits 410 that are to be allocated to each of the rate payers 420 as calculated individually by each of the utility companies 430. In another embodiment, the utility companies 430 provide the administrator 450 with information corresponding to purchase and sale transactions for energy E' conducted between the utility companies 430 and the rate payers 420 within a given period, and the administrator 450 calculates the values representing the number of credits 410 that are to be allocated to each of the respective rate payers 420.

At a predetermined time period such as, for example, monthly, quarterly, semi-annually, annually or the like, or after the accumulation of a predetermined number of credits (e.g., a triggering event), a redemption process 480 is initiated such that the credits 410 accumulated by the rate payers 420 are each redeemed for a predetermined monetary value. A total monetary value for all redeemed credits 410, for example, a redemption value, is provided to the rate payers 420 after redemption and is used by the rate payers 420 to satisfy costs of acquiring the aforementioned life benefits 600 (e.g., benefit costs), or portions thereof. As illustrated in FIG. 4, during the redemption process 480, each credit is redeemable for purchasing, or applied toward the purchase of, a predetermined unit of, or percentage of, a desired one of the life benefits 600. In one embodiment, redemption is supervised by the administrator 450, and the utility companies 430 participating in the system 400 agree, upon occurrence of the triggering event, to remit to the administrator 450 at a predetermined monetary exchange or redemption rate 484 a monetary value representing the monetary equivalent of the total credits 410 held by each of the rate payers 420. For example, at redemption, the administrator 450 requires each of the utility companies 430 within the system 400 to individually remit monetary consideration 482 sufficient to redeem the accumulated credits 410 issued by the individual utility companies 430 or arising from transactions involving the individual utility companies 430. In one embodiment, the utility companies 430 redeem credits 410 at the redemption rate 484 based on, for example, a ratio or percentage of each dollar (revenue) received by the utility company 430 from the rate payers 420 in satisfaction of their monthly billing statements. The total monetary value of the redeemed credits (e.g., the redemption value of the credits) is allocated to accounts 510 assigned to each of the rate payers 420. In one embodiment, the redemption rate is a predetermined percentage of, for example, one percent (1%) of the kilowatt-hour rate the utility company 430 charges its rate payers 420 for their energy usage.

In one embodiment, when the accumulated credits 410 are based on energy E' sold back to the grid 40, the redemption rate 484 is a predetermined percentage of, for example, one percent (1%) of the revenue the utility company 430 receives from the sale or trade of RECs or Carbon Credits in a commodities exchange 436 (e.g., the CCX), or a fixed monetary value based on, for example, a benefit in terms of achieving compliance, the utility company 430 receives by meeting its regulatory mandates as specified by, for example, the RPS, or based on an efficiency rate of RE being generated. As should be appreciated, it is within the scope of the present invention to provide differing redemption rates and associated dollar percentages for redemption.

As shown in FIG. 4, at the conclusion of the redemption process 480, redemption values 512, e.g., portion of the consideration 482 corresponding to each of the rate payers, reside in one or more accounts 510 associated with the rate payers 420 based on the rate payers' redemption of credits 410. In one embodiment, the accounts 510 are maintained by a third party 500 that is not associated with the administrator 450 such as, for example, in a bank or other financial institution. Alternatively, the administrator 450 maintains the accounts 510. At a predetermined period such as, for example, monthly, quarterly, yearly, or concurrently with the conclusion of the redemption process 480, the rate payers 420 use the funds 512 in the accounts 510 to satisfy benefit costs for obtaining one or more of the aforementioned life benefits 600, or portion thereof, made available through the system 400. For example, the rate payer (RP1) 422 having the redemption value 512 in an account 514 directs payment 512' of a health insurance premium 612 (e.g., the benefit cost) such that the rate payer RP1 422 receives the benefit of health insurance coverage 614 paid totally, or in part, from credits 410 accumulated and redeemed based on the rate payer's RP1 purchase or sale transactions of electricity E' generated from RE sources or other energy conservation activities. In one embodiment, an insurance company 700 issues and maintains the health insurance coverage 614 provided to the rate payer RP1 422, as well as one or more of the other rate payers 420 in the system 400 by providing or sponsoring one or more life benefits 600 such as, for example, the health insurance 610, the life insurance 620, the education 630, the retirement 640 and other benefits. In one embodiment, two or more accounts 510 of a rate payer may be used to satisfy benefit costs for acquiring one or more of the life benefits 600. In one embodiment, the administrator 450 establishes and oversees rules or principles guiding redemption of credits 410 and acquisition of the life benefits 600.

As can be appreciated, the redemption of credits 410 for a monetary value and the presence of monetary funds (e.g., the redemption values 512) in the accounts 510 generates additional income that may be available within the system 400. For example, in one embodiment, the accounts 510 are interest bearing such that a rate of return is paid into the accounts 510 as is generally known with most consumer bank accounts. In one embodiment, the rate of return or interest is added to the accounts 510 to increase the redemption value 512 available to the rate payers 420 to purchase the life benefits 600. In one embodiment, a portion of the rate of return or interest is payable to the administrator 450 to compensate the administrator 450 for its supervisory role in the system 400, or to offset the administrator's expenses in supervising the system 400. In one embodiment, a portion of the consideration 482 paid by the utility companies 430, a portion of the rate of return realized from funds in the accounts 510, or another source of revenue are made available (e.g., loaned) to rate payers 420 and/or the utility companies 430 to encourage investment in renewable energy sources for the generation of clean electrical energy E'. As can be appreciated, other sources of revenue may include governmental initiatives, private funding or the like, intended to encourage development of clean energy. In one embodiment, a rate of return or interest is realized from any loan made to rate payers 420 and utility companies 430 for such development. In one embodiment, the interest from such loans is also made available or reinvested in the system 400, for example, to make new loans.

Figure 5:
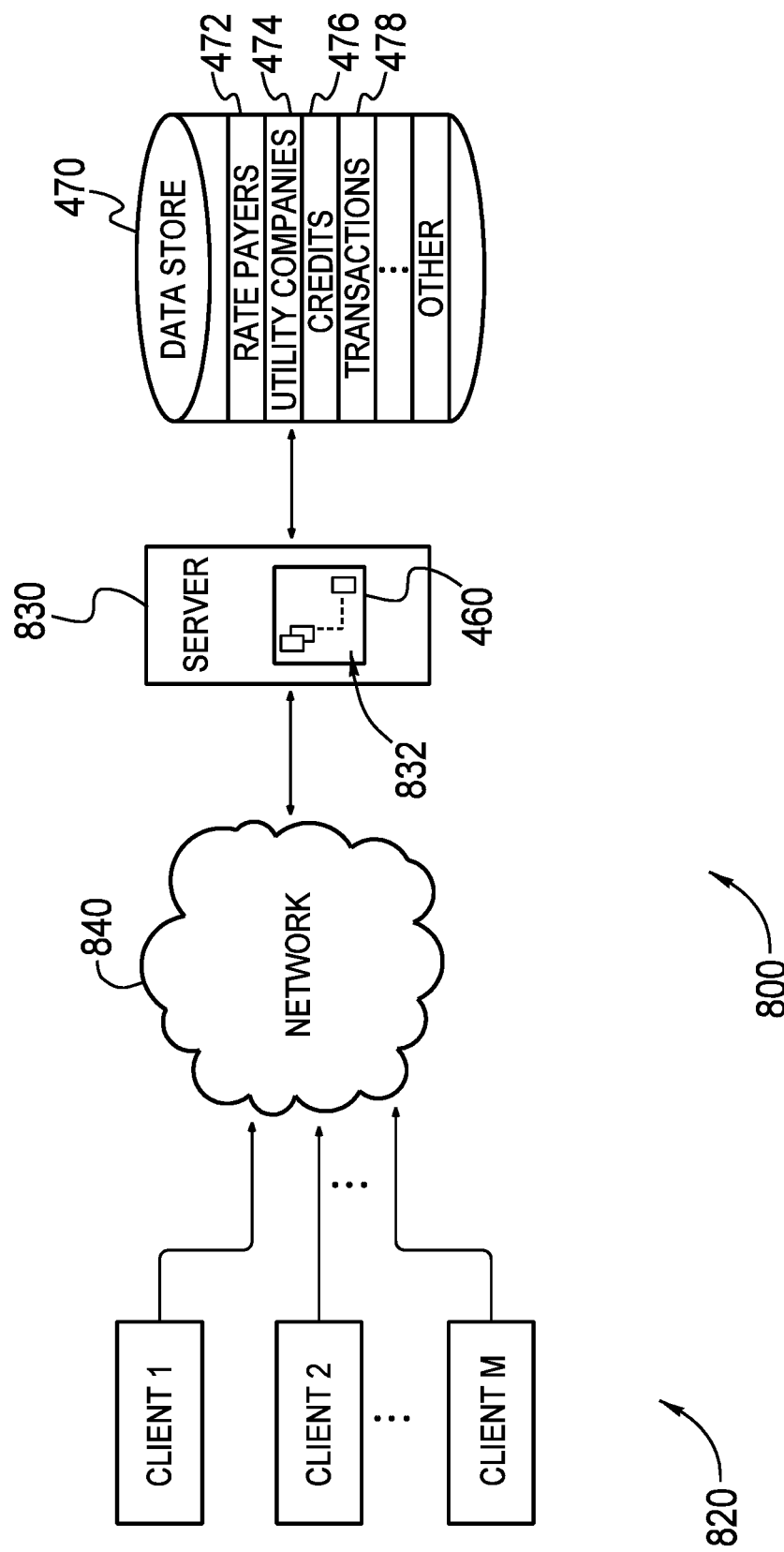
FIG. 5 is a block diagram of a computer network configured for implementing, in accordance with one embodiment of the present invention, the cooperative environmental and life benefit exchange system of FIG. 4.

In one aspect of the invention, the cooperative environmental and life benefit exchange system 400 is provided in, for example, a client-server computer architecture. For example, as shown in FIG. 5, a client-server configured computer processing system 800, operating in accordance with one embodiment of the present invention to implement techniques as described herein, provides the cooperative environmental and life benefit exchange system 400. As shown in FIG. 5, the system 800 includes a plurality of client devices (e.g., Client 1-M), shown generally at 820, operatively coupled to a server device 830 over a communication network 840 such as, for example, the Internet, an intranet, an extranet, or like distributed communication platform connecting computing devices over wired and/or wireless connections. As is known to those skilled in the art, the client devices 820 and the server 830 each include a processor, computer-readable medium or memory, and input-output devices including devices for facilitating communication over the network 840. The processor executes program instructions stored in the memory such that clients (e.g., the rate payers 420, utility companies 430, administrator 450, financial institution 500, insurance company 700, and the like) operating individual ones of the client devices 820 or server device 830 communicate over the network 840 with other client devices 820 as well as other computing devices coupled to the network 840. It should be appreciated that the client devices 820 include, for example, a personal computer (PC), workstation, laptop, tablet computer, personal digital assistant, pocket PC, Internet-enabled mobile radiotelephone, pager or like portable computing devices.

As shown in FIGS. 4 and 5, the server 830 is coupled to the data store 470. It should be appreciated that the data store 470 may be a relational data base, object oriented data base or other suitable data repository, as is known in the art. As noted above, in one embodiment, the data store 470 stores information 472 for identifying rate payers 420, information 474 for identifying utility companies 430, credit information 476, transaction history information 478 and other information necessary or desirable for operating the system 800. In one embodiment, the server 830, the cooperative interface 460 operating thereon, and the data store 470 make information accessible to the rate payers 420, the utility companies 430, the financial institution 500, the insurance company 700, and others, operating one of the client devices 820 by connecting to the server 830. For example, the cooperative interface 460 executes on the server 830 to host a home page and other web pages, shown generally at 832, that are requested by one or more of the rate payers 420, the utility companies 430, the financial institution 500, and the insurance company 700 through designation of a Uniform Resource Locator (URL) identifying the web pages 832 and to provide access to the server 830 from other computing devices 820 coupled to the network 840. In one embodiment, the web pages 832 may be accessed in real-time to determine a total number of credits 410 held by one of the rate payers 420, to monitor status of the accounts 510, or to evaluate options of available life benefits 600 offered through the system 800. In one embodiment, the client devices 820 and the server 830 may access third party computer systems (e.g., the energy commodities trading system 436).

In one embodiment, access to the web pages 832, server 830, the data store 470, selected portions thereof, and/or to selected services and functionality provided by the system 800 (e.g., redemption 480, life benefits 600), is restricted to registered (e.g., "member") ones of the rate payers 420, the utility companies 430, the financial institution 500, the insurance company 700 and others. The client devices 820 execute programs such as, for example, web browser software to request, receive and review the web pages 832. The web pages 832 are generally written in a language that permits a graphical presentation of information (text, images, audio, video, and the like) to persons operating a computing device. Languages include for example, the Hyper-Text Markup Language (HTML), Extensible Markup Language (XML) or another Standard Generalized Markup Language (SGML), as are generally known in the art.

Some perceived benefits of implementing various aspects of the inventive cooperative environmental and life benefit exchange system 400 include, for example, the following.

From a rate payer's perspective, the system 400 provides access to electrical energy generated from renewable sources that may have been previous beyond their financial ability to obtain, while also receiving credits that can be used to continue or to acquire life benefits that may also have previously been out of their reach financially. In some embodiments, funds accumulated in accounts after redemption of credits may provide some tax benefits. For example, in one embodiment, the accounts 510 may be tax-deferred accounts. Also, participation in programs such as retirement programs (e.g., an IRA fund) may provide benefits for rate payers.

From a utility company's standpoint, the system 400 may be seen as a marketing vehicle wherein incentives (e.g., the credits) are provided to rate payers that purchase energy from the utility company. As such, the utility company may increase its customer base by offering participation in the system 400 to its customers. Moreover, as described herein utility companies have certain mandates to minimize harmless greenhouse emissions and/or deploy systems generating energy from renewable sources. As such, participation in the system 400 may provide the utility company with a ready market for renewable energy.

From an insurance company or other company that sponsors or offers one or more of the aforementioned life benefits 600 standpoint, participation in the system 400 may lead to increase customer base by offering a product that has heretofore not been available, e.g., a health insurance policy whose premium is funded totally, or in part, by the customer's energy usage or generation.

From a financial institution's standpoint, participation in the system 400 may lead to increase customer base as one or more of the rate payers may now have accounts (e.g., one or more of the accounts 510) under the institutions management. As in generally known, by increasing the financial institution's assets under management, the institution may obtain one or more additional sources of revenue by reinvesting the funds in the accounts 510. Moreover, the institution may chose to become a featured lender that offers loans for acquisition of renewable energy generating resources by residential, commercial, governmental, non-profit and other organizations as rate payers or utility providers in the system 400.

As should also be appreciated, the system 400 is seen as a means for bolstering demand for renewable energy technology that may stimulate and encourage investment in the electrical infrastructure (e.g., the grid) such that the grid may gradually be transformed to a more environmentally friendly network of electrical power.

One or more embodiments of the present invention have been described. Nevertheless, it will be understood that various modifications may be made without departing from the spirit and scope of the invention. Accordingly, other embodiments are within the scope of the following claims.

Although this invention has been shown and described with respect to the detailed embodiments thereof, it will be understood by those of skill in the art that various changes may be made and equivalents may be substituted for elements and steps thereof without departing from the scope of the invention. In addition, modifications may be made to adapt a particular situation to the teachings of the invention without departing from the essential scope thereof. Therefore, it is intended that the invention not be limited to the particular embodiments disclosed in the above detailed description, but that the invention will include all embodiments falling within the scope of the above description.

What is claimed is:

1. A cooperative environmental and life benefit exchange system, comprising:
   a grid network including a plurality of transmitting facilities for transmitting available electrical energy;
   a plurality of energy generation systems cooperating within the grid network, the energy generation systems include renewable energy generation systems operated by one or more utility companies and by one or more consumers for generating electrical energy provided to the grid network;
   at least one electric meter located at a site of the one or more consumers, the at least one electric meter measuring an amount of electrical energy exchanged between the one or more consumers and the one or more utility companies at the site over a time period;
   a plurality of life benefits each acquired at a benefit cost, the plurality of life benefits selected from health insurance, life insurance, educational assistance, retirement savings, housing allowance, and food allowance;
   a data processor; and
   a memory operatively coupled to the data processor with a plurality of executable program instructions stored therein, the memory including:
      a plurality of consumer accounts of the one or more consumers storing information related to energy purchase and sale transactions documenting the amount of electrical energy measured by the electric meter exchanged between the one or more utility companies and the one or more consumers, the energy purchase and sale transactions including:
         purchases of the amount of electrical energy measured by the meter generated from renewable energy generation systems from the grid network by the one or more consumers and used at the sites of the one or more consumers, and
         sales of the amount of electrical energy measured by the meter generated from renewable energy generation systems operated by the one or more consumers and sold back to the one or more utility companies by the one or more consumers over the grid network;
      a plurality of credits accumulated by the one or more consumers in the plurality of consumer accounts resulting from the energy purchase and sale transactions;
      one or more renewable energy-to-credit conversion rates; and
      one or more credit-to-value redemption rates;
   the data processor configured by the plurality of executable program instructions to:
   determine a value for each of the plurality of credits within the exchange system and an amount of the plurality of credits assigned to each of the plurality of consumer accounts by:
      monitoring the energy purchase and sale transactions;
      assigning the value of each credit corresponding to a predetermined amount of the amount of electrical energy measured by the meter generated from renewable energy generation systems by one of:
         receiving, by the data processor, the value for and the amount of the plurality of credits allocated to the one or more consumers as calculated by the one or more utility companies operating the renewable energy generation systems; and
         calculating, by the data processor, the value for and the amount of the plurality of credits allocated to the one or more consumers by applying the one or more renewable energy-to-credit conversion rates to the predetermined amount of the amount of electrical energy measured by the meter, an applied one of the one or more renewable energy-to-credit conversion rates selected depending on the amount of electrical energy measured by the meter being one of:
            purchased by the one or more consumers from the grid network in energy purchase and sale transactions and used at the site of the one or more consumers; and
            generated by generation systems operated by the one or more consumers and sold back to the grid network by the one or more consumers in the energy purchase and sale transactions;
   initiate a redemption process to redeem a predetermined amount of and value of the plurality of credits accumulated in one or more of the plurality of consumer accounts at the one or more credit-to-value redemption rates to provide a redemption value;
      wherein when the credit being redeemed is based on renewable energy purchased from the grid network, the data processor sets the credit-to-value redemption rate based on a percentage of revenue received by the one or more utility companies operating the renewable energy generation systems providing the electrical energy to the grid network that is purchased by and used at the site of by the one or more consumers; and
      when the credit being redeemed is based on renewable energy generated by and sold back to the grid network by the one or more consumers, the data processor sets the credit-to-value redemption rate based on at least one of:
         revenue received by the one or more utility companies operating the plurality of energy generation systems and trading credits in a commodities exchange; and
         a fixed monetary value remitted by the one or more utility companies operating the plurality of energy generation systems and receiving a benefit in achieving compliance with regulatory mandates for providing renewable energy to the grid network; and the data processor calculates the redemption value by applying the set credit-to-value redemption rate to the predetermined amount of and value for the plurality of credits in the one or more of the plurality of consumer accounts; and remit the redemption value by the data processor to a third party providing one or more of the life benefits to satisfy the benefit cost for acquiring, by the one or more consumers, the one or more of the life benefits or portions thereof.

2. The system of claim 1, wherein the renewable energy generation systems include at least one of solar, photovoltaic, wind, biomass, landfill gas, fuel cells, ocean thermal power, wave or tidal power, hydropower, selected municipal solid waste, and geothermal systems.

3. The system of claim 1, wherein the data processor is operatively coupled to the data store and is configured in a client-server architecture accessible over one of wired and wireless connections over a communication network.

4. The system of claim 1, wherein the data store stores information including at least one of information for identifying consumer accounts, information for identifying energy generation systems, credit information, information regarding the energy purchase and sale transactions, information regarding benefits and benefit cost corresponding thereto, the one or more credit-to-value redemption rates and the one or more credit-to-value redemption rates information.

5. The system of claim 1, wherein the plurality of energy generation systems provide the data processor with information corresponding to the energy purchase and sale transactions conducted between the energy generation systems and the consumer accounts within a given period, and wherein the data processor calculates a value representing a number of credits that are to be allocated to each of the respective consumer accounts within the given period.

6. The system of claim 1, further including a second plurality of consumer accounts, the second plurality of consumer accounts being associated with one or more of the consumer accounts and for receiving the redemption values of redeemed credits of the associated consumer accounts.

7. The system of claim 6, wherein the second plurality of consumer accounts are maintained at a financial institution.

8. The system of claim 3, wherein the client-server architecture is comprised of a cooperative interface executing on a computer processing system to host a plurality of web pages, the web pages being accessible in real-time for viewing a total number of credits held by consumer accounts, for monitoring a status of the redemption values, and for evaluating available life benefits.

9. A method for converting an exchange of electrical energy generated from renewable energy sources into credits redeemable to satisfy a benefit cost of acquiring at least a portion of a life benefit, the method comprising:

transmitting available electrical energy through a grid network including a plurality of transmitting facilities;

generating electrical energy through renewable energy generation systems cooperating within the grid network, the renewable energy generation systems operated by one or more utility companies and by one or more consumers;

providing the generated electrical energy to the grid network, an amount of the provided electrical energy exchanged between the one or more utility companies and the one or more consumers;

providing at least one electric meter located at sites of the one or more consumers, the at least one electric meter measuring the amount of electrical energy exchanged between the one or more utility companies and the one or more consumers over a time period;

providing a data processor and a memory operatively coupled to the data processor, the memory including a plurality of executable program instructions, the data processor configured by the plurality of executable program instructions to:

monitor, through a plurality of consumer accounts of the one or more consumers, energy purchase and sale transactions exchanging the amount of electrical energy measured by the meter between the one or more utility companies and the one or more consumers, the transactions including:

purchases from the grid network of the amount of electrical energy measured by the meter generated from renewable energy generating systems and used at the sites of the one or more consumers, and sales of the amount of electrical energy measured by the meter generated from the renewable energy generation system operated by the one or more consumers and sold back to the one or more utility companies by the one or more consumers over the grid network;

record a plurality of credits corresponding to the purchase and sale of electrical energy generated from renewable energy generation systems, and accumulate the plurality of the credits in the plurality of consumer accounts; and determine a value of each credit and an amount of credits assigned to each of the plurality of consumer accounts by:

monitoring the energy purchase and sale transactions;

assigning the value of each credit corresponding to a predetermined amount of the amount of electrical energy measured by the meter generated from renewable energy generating systems by one of:

receiving, by the data processor, the value for and the amount of the plurality of credits allocated to the one or more consumers as calculated by the one or more utility companies operating the renewable energy generation systems; and calculating, by the data processor, the value for and the amount of the plurality of credits allocated to the one or more consumers by applying one or more renewable energy-to-credit conversion rates to the predetermined amount of the amount of electrical energy measured by the meter, an applied one of the one or more renewable energy-to-credit conversion rates selected depending on the amount of electrical energy measured by the meter being one of:

purchased from the grid network in energy purchase and sale transactions and used at the site of the one or more consumers; and generated by generation systems operated by at the site of the one or more consumers and sold back to the grid network by the one or more consumers in the energy purchase and sale transactions;

initiate a redemption process to redeem a predetermined amount of and value for the plurality of credits accumulated in one or more of the plurality of consumer accounts at one or more credit-to-value redemption rates to provide a redemption value;

wherein when the credit being redeemed is based on renewable energy purchased from the grid network, the data processor sets the credit-to-value redemption rate based on a percentage of revenue received by the one or more utility companies operating the renewable energy generation systems providing the electrical energy to the grid network that is purchased and used by the one or more consumers; and when the credit being redeemed is based on renewable energy generated by and sold back to the grid network by the one or more consumers, the data processor sets the credit-to-value redemption rate based on at least one of:

revenue received by the one or more utility companies operating the plurality of energy generation systems and trading credits in a commodities exchange; and a fixed monetary value remitted by the one or more utility companies operating the plurality of energy generation systems and receiving a benefit in achieving compliance with regulatory mandates for providing renewable energy to the grid network; and the data processor calculates the redemption value by applying the set credit-to-value redemption rate to the predetermined amount of and value for the plurality of credits in the one or more of the plurality of consumer accounts; and remit the redemption value by the data processor to a third party providing one or more of the life benefits to satisfy a benefit cost for acquiring, by the one or more consumers, the one or more life benefits or portions thereof, the plurality of life benefits selected from health insurance, life insurance, educational assistance, retirement savings, housing allowance, and food allowance.

\* \* \* \* \*